United States Patent
Musselman et al.

[11] Patent Number: 5,225,115
[45] Date of Patent: Jul. 6, 1993

[54] BROMIDE INTERCALATED HYDROTALCITE FOR USE AS A FLAME RETARDANT, SMOKE SUPPRESSANT ADDITIVE

[75] Inventors: Lawrence L. Musselman, Apollo; Chanakya Misra, Pittsburgh; Donald K. Grubbs, Rector; Donald R. Smith, Trafford, all of Pa.

[73] Assignee: Aluminum Company of America, Pittsburgh, Pa.

[21] Appl. No.: 597,535

[22] Filed: Oct. 15, 1990

Related U.S. Application Data

[63] Continuation-in-part of Ser. No. 287,070, Dec. 21, 1988.

[51] Int. Cl.$^5$ ............................................. C09K 21/02
[52] U.S. Cl. ..................................... 252/609; 252/602
[58] Field of Search ........................ 252/609, 601, 602; 162/159

[56] References Cited

U.S. PATENT DOCUMENTS

| | | | |
|---|---|---|---|
| 4,085,088 | 4/1978 | Miyata et al. | 524/436 |
| 4,154,718 | 5/1979 | Miyata et al. | 524/423 |
| 4,351,814 | 9/1982 | Miyata et al. | 423/306 |
| 4,710,551 | 12/1987 | Miyata | 526/91 |
| 4,883,533 | 11/1989 | Kosin et al. | 106/18.14 |
| 4,904,457 | 2/1990 | Misra | 423/115 |
| 5,055,199 | 10/1991 | O'Neill et al. | 210/684 |
| 5,068,095 | 11/1991 | Nigro et al. | 423/122 |
| 5,075,089 | 12/1991 | Misra et al. | 423/331 |

Primary Examiner—Robert L. Stoll
Assistant Examiner—Joseph D. Anthony
Attorney, Agent, or Firm—David W. Pearce-Smith

[57] ABSTRACT

A filler material for use in a polymer or paper system. The filler material is formed by heating hydrotalcite to less than approximately 600° C. to remove most of the carbonate and water of hydration; submersing the hydrotalcite in a NaBr solution for 1–24 hours in a nitrogen atmosphere to form a bromide intercalated hydrotalcite; and adding the bromide intercalated hydrotalcite as a 25–65 wt % filler in a polymer system selected from the group of polypropylene, polybutylene terephtalate, nylon, and acrylonitrile-butadiene-styrene.

26 Claims, 5 Drawing Sheets

BROMIDE INTERCALATED HYDROTALCITE FOR USE AS A FLAME RETARDANT, SMOKE SUPPRESSANT ADDITIVE

CROSS REFERENCE TO RELATED APPLICATIONS

This application is a continuation-in-part of U.S. patent application Ser. No. 287,070, filed Dec. 21, 1988.

TECHNICAL FIELD

This invention relates to additive materials used as flame retardants and smoke suppressants in polymer compounds and paper. More particularly, the invention relates to modifying hydrotalcite to improve its thermal stability and thus enhance flame retardancy and/or smoke suppressancy of the polymer compounds.

BACKGROUND ART

Endothermic particulate hydroxides have been identified as commercial or potentially commercial flame retardants in polymers, paper and other matrices in the literature. However, different materials have temperature constraints which limit the variety of polymer systems within which they can be used. These temperature limitations include the temperature at which the polymer system is processed and the temperature at which the flame retardant additive begins to decompose and act as a flame retardant.

For example, aluminum trihydroxide (alumina trihydrate) is a well-known endothermic flame retardant additive or filler which has been found to be effective in several important polymer systems. It is commonly used at loadings of up to 75 weight percent of the polymer. Although alumina trihydrate is effective, its use is limited to polymers that are processed at temperatures below 220° C., the point where its water of hydration begins to evolve. At processing temperatures above about 220° C., alumina trihydrate decomposes to alumina and water vapor. The water vapor produces unacceptable surface defects and porosity in the finished product, and can damage processing equipment. Water vapor and/or steam which builds up in the processing equipment can cause both mechanical failure and injury to equipment operators.

It is the heat capacity and water of hydration of aluminum trihydroxide that makes it effective as a flame retardant additive. To maintain burning in plastic systems, three ingredients need to be supplied: heat, fuel and oxygen. Alumina trihydrate is effective as a flame retardant because its endothermic decomposition acts as a cooling heat sink to remove heat from the plastic--heat which would ordinarily go toward decomposing the plastic into the low molecular weight gaseous elements needed to sustain combustion. Water liberated from the decomposition of the hydrate also serves to inhibit the access of oxygen to the plastic systems and dilute the combustible gases. Thus, the addition of alumina trihydrate transforms an exothermic, flame-propagating polymer system into an endothermic, flame-retarding system.

Some of the common polymers for which alumina trihydrate finds use as a flame retardant include polyurethane, polyethylene, varieties of polypropylene having low processing temperatures and some unsaturated polyesters. Alumina trihydrate is compatible with these polymers because the endothermic decomposition temperature of the alumina trihydrate (about 220-300° C.) is above their processing temperatures.

Alumina trihydrate is not presently used as a flame-retardant additive in several other classes of polymers, including for example polyethylene terephthalate (PET), polybutylene-terephthalate (PBT), acrylonitride-butodienestyrene(ABS), nylon, and varieties of polypropylene having high process temperatures. When the trihydrate is added to such polymers, the trihydrate can decompose to alumina and water vapor during processing. The water vapor produces foaming or voids in the polymer matrix. These voids produce surface defects which are unacceptable for most final products.

Many other inorganics possessing "water of hydration" have not been widely used as flame retardants because their water releasing endothermic reactions occur at too low a temperature. One such material is hydrotalcite which is a magnesium aluminum carbonate hydroxide material having the general formula: $Mg_xAl_2(OH)_{2x+4}(CO_3) \cdot yH_2O$ where x varies from 3 to 6 and y varies from 2 to 4. Hydrotalcite has the potential of being a good flame retardant because it possesses water of hydration like hydrated alumina (alumina trihydrate). However, it has not found widespread commercial acceptance as a flame retardant because it has a low temperature endotherm peak at approximately 219° C. (see FIG. 2) and liberates 15 wt.% water when heated to 200° C. (see FIG. 3).

Attempts have been made in the past to calcine hydrotalcite at a temperature above the processing temperature of the polymer system in which it will be used. The calcined hydrotalcite could then be used as a flame retardant additive which releases its water of hydration at temperatures above the processing temperature of the polymer and below the decomposition temperature of the polymer. The calcined hydrotalcite must either be used immediately after calcining or stored in a manner that will prevent it from reverting back to its original composition.

U.S. Pat. No. 4,883,533 issued to Kosin et al discloses a phosphate containing hydrotalcite for improving the flame retardant characteristics of plastic systems such as polypropylene.

U.S. Pat. No. 4,351,814 issued to Miyata et al discloses hydrotalcites having a hexagonal needle-like structure and process for production thereof. The hydrotalcite compounds have the formula: $Mg(OH)_{2-n'x} \cdot 2A_{x2}{}^{n-} \cdot m_2H_2O$ where $A_{x/n}{}^{n-}$ represents anions which include bromide (Br−).

U.S. Pat. No. 4,562,295 issued to Miyata discloses a method of purifying cyclohexanone containing by-product organic acids. The method includes contacting the cyclohexanone with a hydrotalcite having the formula: $Mg^{2+}+M_x{}^{3+}(OH)_{2x+6-nz}(A^{n-})_z \cdot mH_2O$ where $A^{n-}$ represents anions which include bromide (Br−).

U.S. Pat. No. 4,642,193 issued to Miyata et al discloses a method for purification of the cooling water used in nuclear reactors. The method includes contacting the cooling water with a hydrotalcite having the formula: $Mg_{1-x}{}^{2+}M_x{}^{3+}(OH)_2A_{x/n}{}^{n-} \cdot mH_2O$ where $A_{x/n}{}^{n-}$ represents anions which include bromide (Br−).

U.S. Pat. No. 4,710,511 issued to Miyata discloses a process for producing a vinyl chloride polymer or copolymer in aqueous suspension using a hydrotalcite compound as suspension stabilizer. The hydrotalcite compounds have the formula: $Mg_{1-x}{}^{2+}M_x{}^{3+}(OH)$-

$_2A_{x/n}{}^{n-}.mH_2O$ where $A_{x/n}{}^{n-}$ represents anions which include bromide ($Br^-$).

U.S. Pat. No. 4,710,551 issued to Miyata discloses a process for producing a vinyl chloride polymer or copolymer in aqueous suspension using a hydrotalcite compound as suspension stabilizer. The hydrotalcite compounds have the formula: $Mg_{1-x}{}^{2+}M_x{}^{3+}(OH)$-$_2A_{x/n}{}^{n-}.mH_2O$ where $A_{x/n}{}^{n-}$ represents anions which include bromide ($Br^-$).

U.S. Pat. No. 4,904,457 issued to Misra discloses a method for producing synthetic hydrotalcite by reacting activated magnesia with an aqueous solution containing aluminate, carbonate, and hydroxyl ions.

There currently exists a need for low-cost additive materials that can be used as flame retardants and smoke suppressants in polymer systems processed at higher temperature. There also exists a need for low-cost materials that have endotherms which begin at temperatures that are higher than alumina trihydrate. The endotherms of these materials must be matched to the processing temperatures and/or exothermic characteristics of each polymer system involved.

In addition, a need exists for a method of converting materials that evolve gas at temperatures which are detrimental to the processing of polymer systems, such as hydrotalcite, into materials that do not evolve gas at temperatures which are detrimental to the processing of polymer systems and possess a flame retarding endotherm below the decomposition temperature of the polymer.

The principal object of the present invention is to provide additive material for use as a flame retardant and smoke suppressant in polymer, paper and other matrices.

Another object of the invention is to provide an additive material for use as a flame retardant in polymer systems which possesses enhanced thermal stability.

Another object of the invention is to provide an additive material for use as a smoke suppressant in polymer systems.

Another object of the present invention is to provide a method of creating a new additive material for use as a flame retardant in polymer systems which is designed to meet the specific needs of that polymer system.

Additional objects and advantages of the present invention will be more fully understood and appreciated with reference to the following description.

DISCLOSURE OF THE INVENTION

In accordance with the present invention, a method is disclosed for improving the flame retardancy of a polymer system. The method comprises the steps of: (1) providing hydrotalcite which has been treated to remove most of carbonate and water of hydration in said hydrotalcite; (2) intercalating halide(s) selected from the group of chloride and bromide into said treated; and (3) adding the halide-intercalated hydrotalcite as a filler in a paper or polymer system.

In a preferred embodiment of the invention, the halide is bromide and it is provided from a sodium bromide solution. The hydrotalcite may be either synthetic or natural hydrotalcite having the formula $6 MgO.Al_2O_3.CO_2.12H_2O$ or $Mg_6Al_2(OH)_{16}CO_3.4H_2O$ or similar hydrotalcite-like material or it may be formed by adding MgO to sodium aluminate-carbonate liquor from the Bayer process such as that described in U.S. Pat. No. 4,904,457 issued to Misra.

In a preferred embodiment of the present invention, the filler material is formed by heating hydrotalcite to less than approximately 600° C. to remove most of the chemically bound carbonate and water. The calcined hydrotalcite is then submersed in a NaBr solution for 1-24 hours in a nitrogen atmosphere to form a bromide-intercalated hydrotalcite. Afterwards, the bromide-intercalated hydrotalcite is used as a 25-65 wt % filler in a polymer system. The polymer system may be selected from polymers requiring higher temperature processing conditions than are feasible with alumina trihydrate such as polymers selected from the group of polypropylene, polybutylene terephtalate, nylon, and acrylonitrile-butadiene-styrene.

BRIEF DESCRIPTION OF THE DRAWINGS

Other features of the present invention will be further described or rendered obvious in the following related description of the preferred embodiment which is to be considered together with the accompanying drawings, wherein.

BEST MODE FOR CARRYING OUT THE INVENTION

Figure 1A:
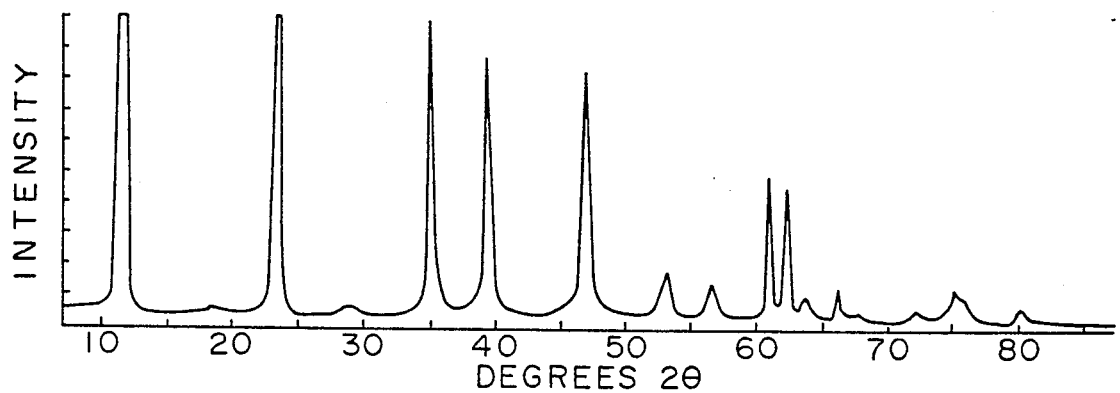
FIGS. 1a-c are graphical illustrations showing the x-ray diffraction patterns for hydrotalcite (FIG. 1a), alumina substituted magnesia (calcined hydrotalcite) (FIG. 1b) and bromide-intercalated hydrotalcite (FIG. 1c)

As previous stated, aluminum trihydroxide is known to be an effective flame-retardant additive for several polymeric materials. By the term aluminum trihydroxide, we mean $Al_2O_3.3H_2$. Historically, the terms aluminum trihydroxide, alumina hydrate, gibbsite, alumina trihydrate (ATH) and hydrated alumina have been used to describe Al₂O₃.3H₂O. The most technically correct term of these terms is aluminum trihydroxide which is based on the chemical formula Al(OH)₃. However, the most common term used is alumina trihydrate. For convenience, we will use the term alumina trihydrate to refer to Al₂O₃.3H₂O. The water of hydration is 34.6 percent by weight.

The reason the term alumina trihydrate has become more common and thus the preferred term over alumina trihydroxide is that upon decomposition approximately 34.6% by weight is released as water. This "water of hydration" is stable to between 220 and 230° C. at the process heating rates and residence times used in many plastics processing systems. Upon heating alumina trihydrate to temperatures higher than about 220 to 230° C., the hydrate (hydroxyl groups) begins to decompose endothermically. The by-products of decomposition are simply anhydrous alumina and water:

2Al(OH)₃→Al₂O₃+3H₂O

The measured enthalpy (heat of dehydroxylation) for alumina trihydrate is 280 cal/g.

When alumina trihydrate is used as a flame retardant in polymer systems, its considerable absorption of heat makes less heat available for decomposing a polymer system into the low molecular weight fuel gases that support combustion.

Hydrotalcite can be transformed, via intercalation or pillaring, from a material which has a substantial weight loss beginning at about 50° C. to a material that is stable at temperatures in excess of 250° C.

The modified hydrotalcite is stable to a processing temperature much higher than the processing temperatures used to create the modified material. For example, when hydrotalcite is calcined to 500° C. and sodium bromide is substituted at the site of the carbonate and water of hydration, the new material has an endotherm which begins at 275° C. and is stable to rehydration in ambient air. Thus the modified hydrotalcite does not suffer from the same deficiencies as the original hydrotalcite and it need not be used immediately after formation nor stored in a manner that will prevent it from reverting back to its original composition. The initial hydrotalcite is not critical to practicing the present invention and it may be natural hydrotalcite having the formula 6.MgO.Al₂O₃.CO₂.12H₂O or Mg₆Al₂(H)₁.₆CO₃.4H₂O or it may be formed by adding MgO to liquor from the Bayer process. In addition, other sources of hydrotalcite material, such as that described in U.S. Pat. No. 4,904,457 issued to Misra, may also be used. The teachings of U.S. Pat. No. 4,904,457 are herein incorporated by reference.

The polymer systems in which the materials of the present invention find use as a flame retardant additive include, but are not limited to, latexes, polypropylene, polyester and polyamide carpet grade polymers such as nylon, polyurethane compositions, polystyrene, PET, varieties of molding grade polypropylenes such as polypropylene-homopolymer, and polypropylene-copolymers and blends thereof, ethylene polymer compositions including low density polyethylene, ethylene-vinyl acetate copolymers and ethylene ethyl acrylate copolymers, nylon compositions including nylon 6, nylon 6,6, nylon 6,10, nylon 11 and nylon 12 and other similar thermoplastic thermosetting and elastomeric polymer systems.

Materials that may be substituted into the site created by the removal of the water of hydration and/or carbonate include, but are not limited to, halide salts. The term "halide salts38 is used herein to refer to inorganic salts containing a halide anion selected from the group of chloride and bromide. Examples of inorganic salts include sodium bromide and sodium chloride.

The present invention teaches a new concept in preparing flame retardant materials. It is contemplated that this new concept teaches enough so that routine engineering skills are all that are required to calcine the initial material or to otherwise develop sites for intrusion, sealing or reaction and then substitute a new material at the site to create a new flame retardant material. The new flame retardants created can then be routinely tested to determine the magnitude and temperature of its endotherms to evaluate the new material and determine in which polymer systems it can be most advantageously used.

The following examples illustrate preferred modes of practicing the present invention.

EXAMPLE 1

Hydrotalcite (magnesium aluminum carbonate hydroxide) material, which was formed by adding MgO to Bayer liquor, was placed in a differential scanning calorimeter and tested. X-ray diffraction analysis of the hydrotalcite was as follows:

| D-spacing | Intensity |
|---|---|
| 7.76 | 100.0 |
| 3.89 | 38.5 |
| 2.59 | 27.0 |
| 2.30 | 13.7 |
| 1.53 | 29.3 |
| 1.50 | 14.3 |

The results of X-ray diffraction are shown in FIG. 1(a).

Figure 2:
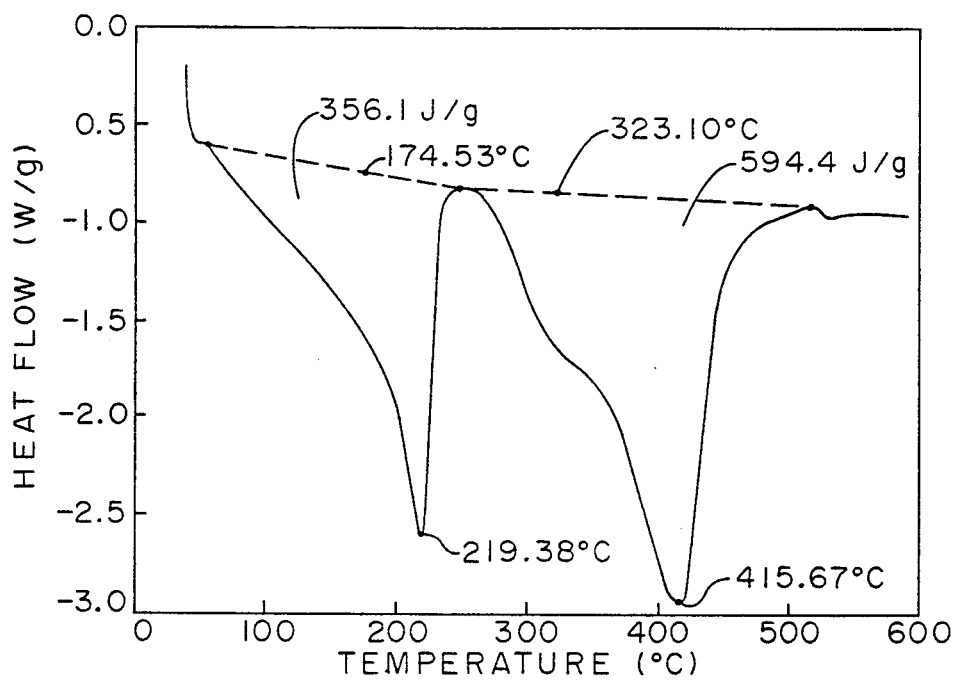
FIG. 2 is a graphical illustration showing differential calorimeter (DSC) measurement of hydrotalcite.
Figure 3:
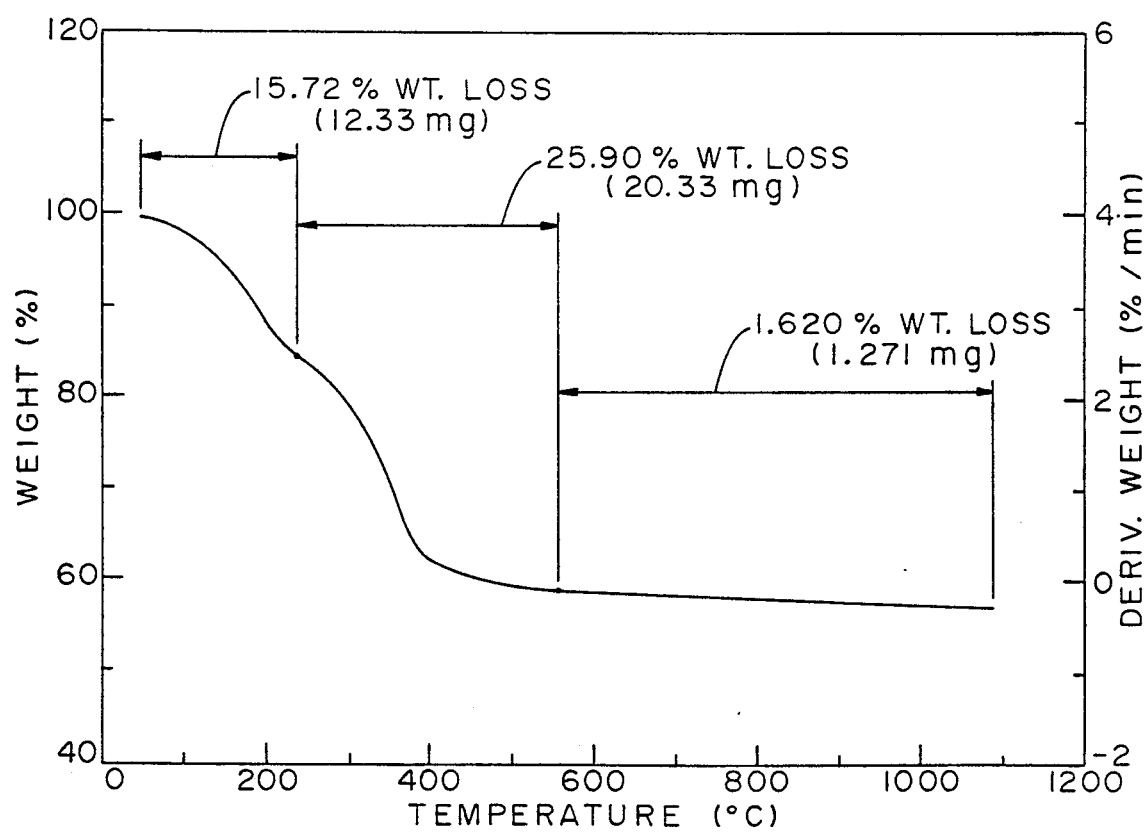
FIG. 3 is a graphical illustration showing thermogravimetric analysis of hydrotalcite.

The results of the differential scanning calorimeter testing are shown as the solid line in FIG. 2. The material of Example 1 was tested as a control. Hydrotalcite (HTC) is not widely used in polymer systems because of its low temperature endotherm (see FIG. 2) and release of water below 200° C. (see FIG. 3). If hydrotalcite is used in polymer systems that are processed at temperatures above approximately 100 ° C., it could create large surface defects in finished products or cause catastrophic pressure buildup during the thermal cycle of the polymer's molding operation.

EXAMPLE 2

Five pounds of synthetic hydrotalcite material (formed from the same source as that used in Example 1) was heated (calcined) to 500° C. for 4 hours to drive off most of its hydroxyl and carbonate groups and form an alumina substituted magnesia. X-ray diffraction analysis of the alumina substituted magnesia (calcined hydrotalcite) is as follows:

| D-spacing | Intensity |
|---|---|
| 2.08 | 100.0 |
| 1.47 | 25.3 |

Figure 1B:
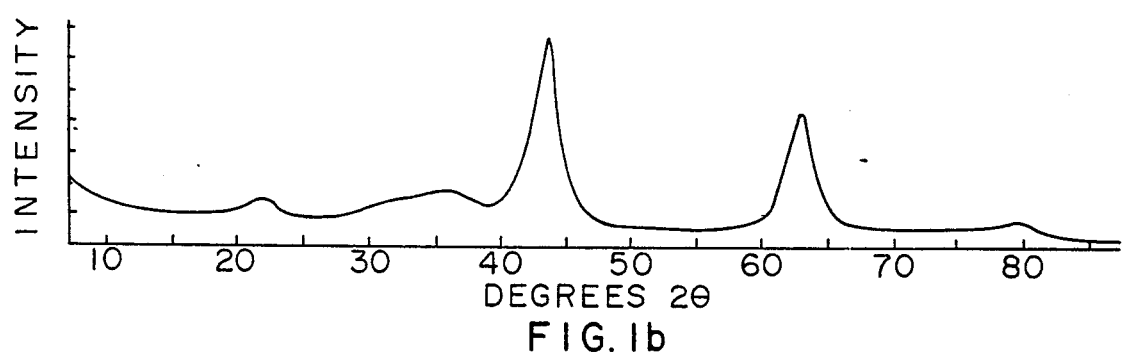

The results of X-ray diffraction are shown in FIG. 1(b).

The alumina substituted magnesia is immediately placed in an autoclave containing 15 liters of a 250 grams per liter solution of sodium bromide (NaBr) which had been heated to 95° C. The autoclave was purged with a nitrogen atmosphere to prevent carbonation of the NaBr solution. Bromide anions were thus intercalated into the lattice structure of the hydrotalcite. Samples of the bromide intercalated hydrotalcite were removed from the sodium bromide solution after 1, 2, 4 and 24 hours. These materials were analyzed and found to contain 12.6, 13.8, 14.6 and 14.8 wt % bromide, respectively. X-ray diffraction analysis of material confirmed that the product was reconstituted bromide intercalated hydrotalcite. X-ray diffraction analysis of material is as follows:

| D-spacing | Intensity |
|---|---|
| 7.76 | 100.0 |
| 3.90 | 38.5 |
| 2.58 | 27.0 |
| 2.37 | 13.7 |
| 1.53 | 29.3 |
| 1.50 | 14.3 |

Figure 1C:
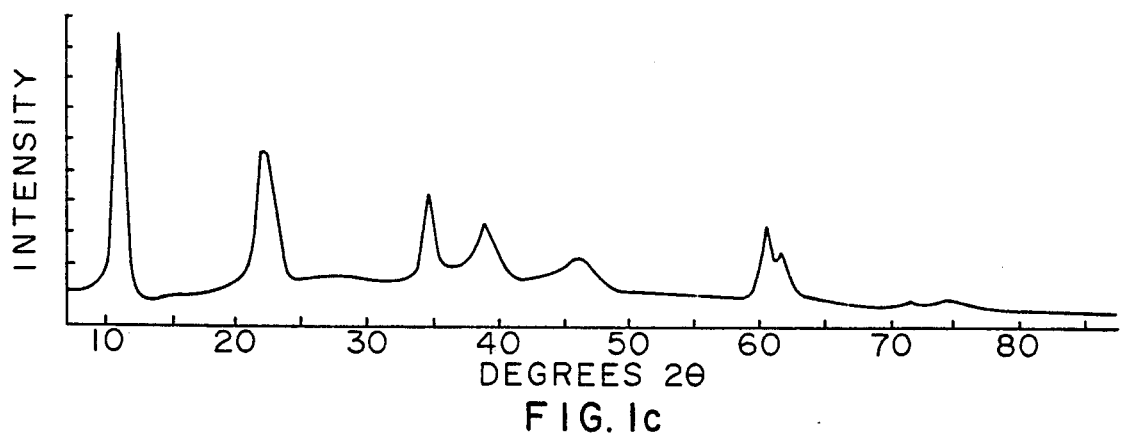

The results of X-ray diffraction are shown in FIG. 1(c).

Figure 4:
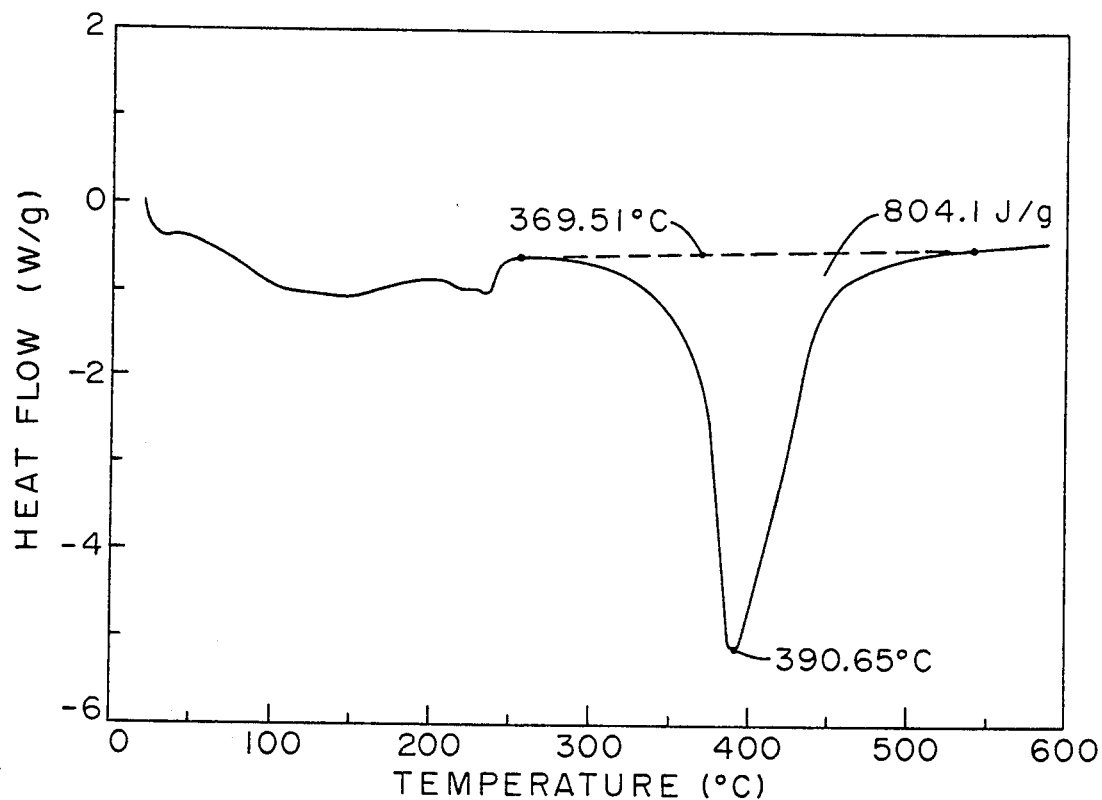
FIG. 4 is a graphical illustration showing differential calorimeter (DSC) measurement of bromide-intercalated hydrotalcite.

The results of differential scanning calorimetry for the bromide-intercalated hydrotalcite are shown in FIG. 4. The material of Example 2, which was removed from the sodium bromide solution after 24 hours, was found to have its first endotherm at 391° C. This endotherm began at 275° C and was calculated to be 804 Joules per gram.

Figure 5:
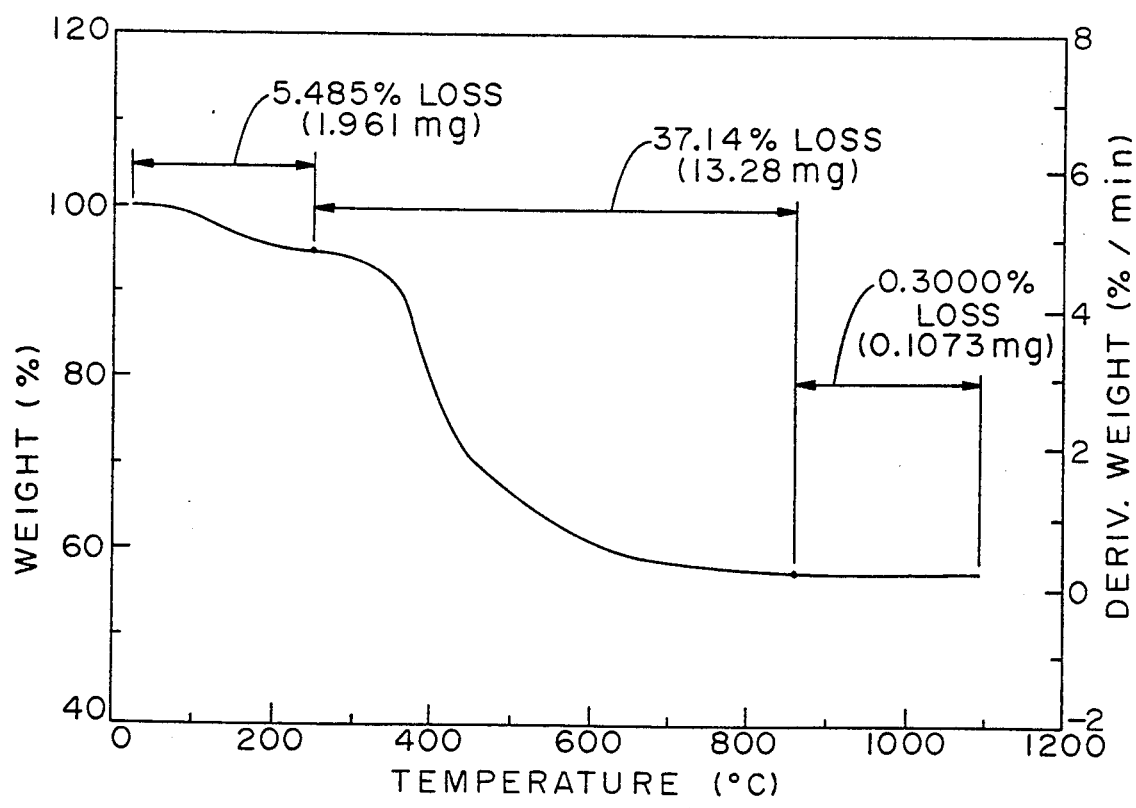
FIG. 5 is a graphical illustration showing thermogravimetric analysis of bromide-intercalated hydrotalcite.

A thermogravimetric analysis of the 36 milligrams of the material was performed in air at a temperature rate of 20° C. per minute to 1100° C. As can be seen in FIG. 5, the bromide modified material has found to have a 5.3% weight loss beginning at about 100° C. and a 37% weight loss which began at about 300° C. and peaked at 400° C.

EXAMPLE 3

A sample of a bromide-intercalated hydrotalcite was prepared in a manner similar to that described in Example 2 for use as a filler in polypropylene. The bromide-intercalated hydrotalcite was used at 0%, 30%, 40%, 50%, 55% and 63% (wt %) loadings. Oxygen index and vertical burn testing was then performed on a specimen taken from each sample.

Oxygen index is a flammability test for plastics, ASTM D-2863-74. This method describes a procedure for determining the relative flammability of cellular plastics by measuring the minimum concentration of oxygen in a slowly rising mixture of oxygen and nitrogen that will just support combustion. The higher the oxygen index, the more flame retardant the material.

Vertical burn test used is ANSI/UL 94-1985 which is a standard test for flammability of plastic materials that has been developed by Underwriters Laboratories Inc. for American National Standard. The meanings of the vertical burn ratings used in ANSI/UL 94-1985 are as follows:

V-2—indicates that the total flaming combustion time for 5 samples is less than 250 seconds and no single sample can burn for more than 30 seconds. Flaming drips from the sample are permitted. Glowing combustion may not be persist in any. sample for more the 60 seconds after removal of the flame.

V-1—indicates that the total flaming combustion time for 5 samples is less than 250 seconds and no single sample can burn for more than 30 seconds. No flaming drips from the sample are permitted. Glowing combustion may not be persist in any sample for more the 60 seconds after removal of the flame.

V-0—indicates that the total flaming combustion time for 5 samples is less than 50 seconds and no single sample can burn for more than 10 seconds. No flaming drips from the sample are permitted. Glowing combustion may not be persist in any sample for more the 30 seconds after removal of the flame.

Failed—indicates that the sample does not meet at least the V-2 criteria.

The oxygen index and vertical burn values for polypropylene containing bromide-intercalated hydrotalcite at the various loading levels are as follows:

| % Loading | Oxygen Index | Vertical Burn |
|---|---|---|
| 0% | 18.0 | Failed |
| 30% | 21.0 | Failed |
| 40% | 21.5 | Failed |
| 50% | 23.5 | Failed |
| 55% | 24.5 | V-1 |
| 63% | 27.5 | V-0 |

EXAMPLE 4

The procedures of Example 3 were repeated except that the synthetic hydrotalcite material Example 1 was used as a filler in polypropylene. The oxygen index and vertical burn values for polypropylene containing hydrotalcite at the various loading levels are as follows:

| % Loading | Oxygen Index | Vertical Burn |
|---|---|---|
| 0% | 18.0 | Failed |
| 30% | 19.5 | Failed |
| 40% | 21.5 | Failed |
| 50% | 22.5 | Failed |
| 55% | 24.5 | Failed |
| 63% | 27.0 | V-0 |

EXAMPLE 5

The procedures of Example 3 were repeated except that aluminum trihydrate (ATH) was used as a filler in polypropylene. The oxygen index and vertical burn values for the polypropylene containing bromide-intercalated hydrotalcite at the various loading levels are as follows:

| % Loading | Oxygen Index | Vertical Burn |
|---|---|---|
| 0% | 18.0 | Failed |
| 30% | 20.0 | Failed |
| 40% | 21.5 | Failed |
| 50% | 23.5 | Failed |
| 55% | 25.0 | Failed |
| 63% | 28.5 | V-0 |

Figure 6:
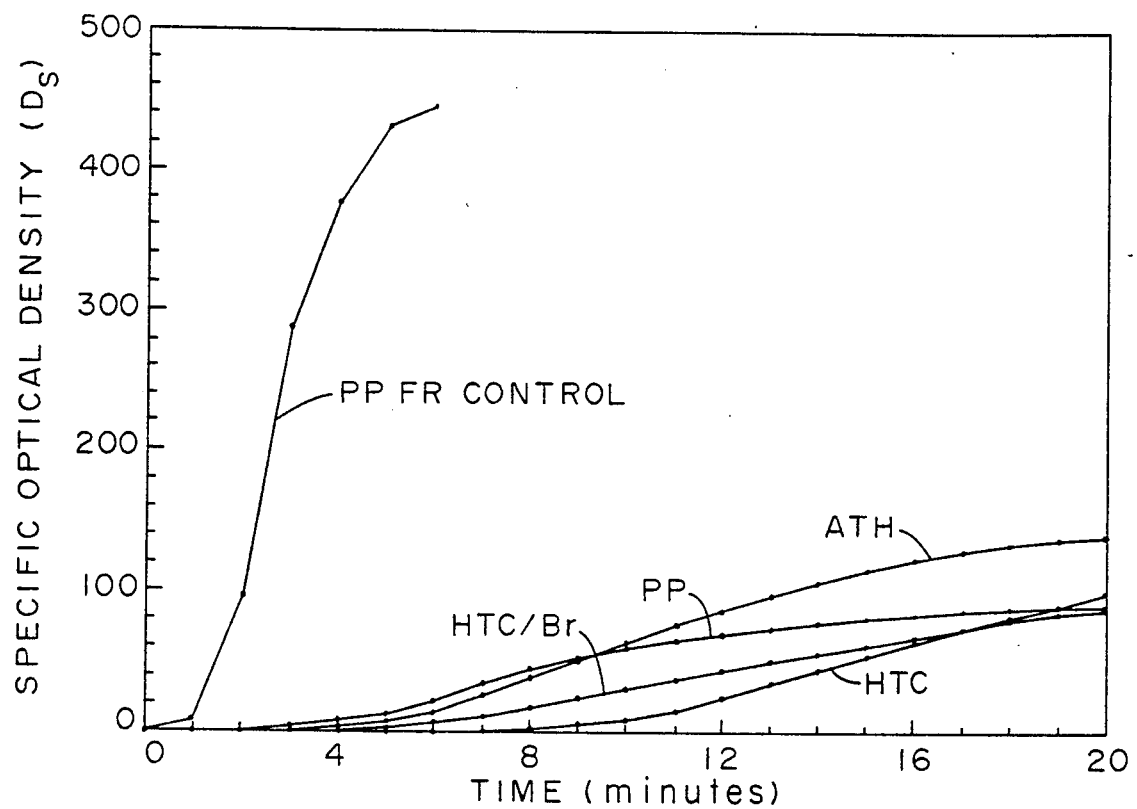
FIG. 6 is a graphical illustration showing comparative smoke density for polypropylene (PP) and polypropylene containing hydrotalcite (HTC), bromide intercalated hydrotalcite (HTC/Br), aluminum trihydrate (ATH) and a commercially available halogen containing flame retardant(FR Control)

A comparison of the oxygen index and vertical burn data for Examples 3-5 indicate that the bromide-intercalated hydrotalcite performed at least as well as hydrotalcite and ATH in polypropylene. In addition, FIG. 6 illustrates a comparison of the smoke densities of the materials of Examples 3-5 at 63 wt % with ARISTECH CRVO-8, a commercially available flame retardant polypropylene. ARISTECH CRVO-8 has a vertical burn rating of V-0 and oxygen index of 28.0. FIG. 6 shows that both hydrotalcite and bromide-intercalated hydrotalcite performed significantly better than ARISTECH CRVO-8.

EXAMPLE 6

The procedures of Example 3 were repeated except that the bromide-intercalated hydrotalcite was used as a filler in nylon. The oxygen index and vertical burn values for nylon-6 containing bromide-intercalated hydrotalcite at the various loading levels are as follows:

| % Loading | Oxygen Index | Vertical Burn |
| --- | --- | --- |
| 0% | 21.5 | Failed |
| 30% | 26.0 | Failed |
| 40% | 26.5 | Failed |
| 50% | 29.5 | V-0 |
| 55% | 33.0 | V-0 |
| 63% | 42.0 | V-0 |

EXAMPLE 7

The procedures of Example 3 were repeated except that the synthetic hydrotalcite material of Example 1 was used as a filler in nylon-6. The oxygen index and vertical burn values for nylon-6 containing hydrotalcite at the various loading levels are as follows:

| % Loading | Oxygen Index | Vertical Burn |
| --- | --- | --- |
| 0% | 21.5 | Failed |
| 30% | 25.5 | Failed |
| 40% | 29.0 | Failed |
| 50% | 28.5 | Failed |
| 55% | 29.5 | Failed |
| 63% | 34.5 | V-0 |

Figure 7:
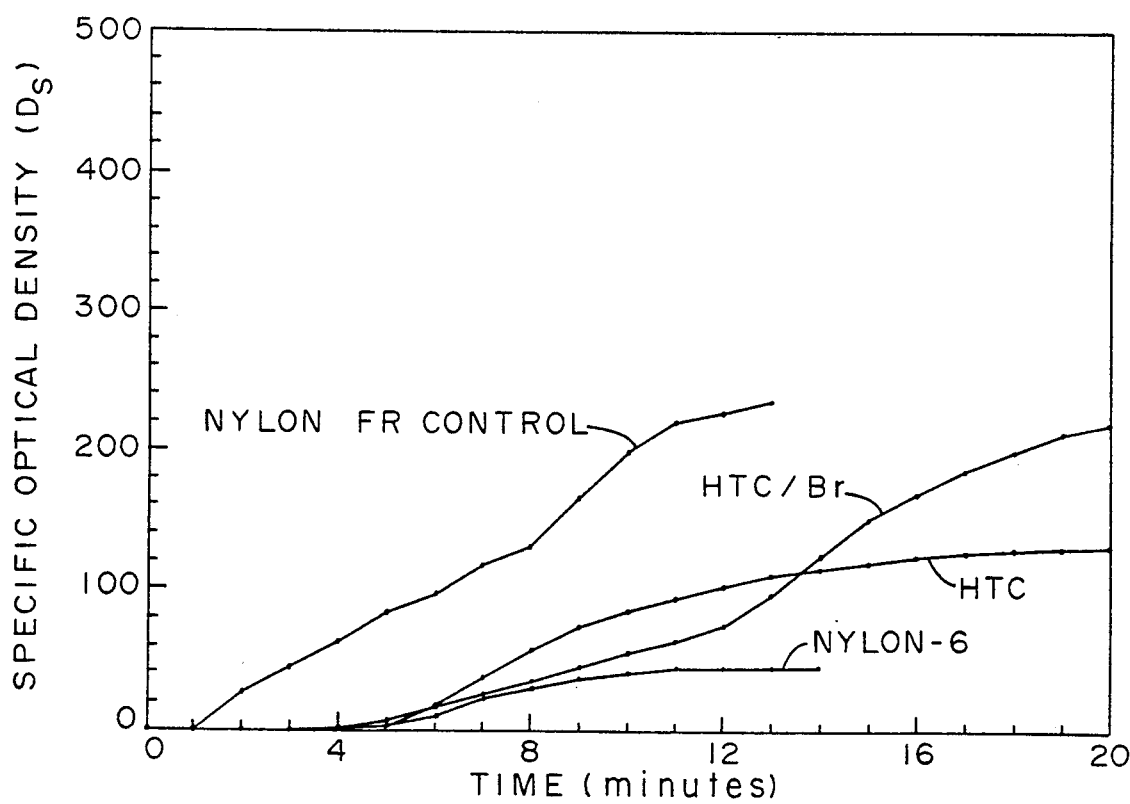
FIG. 7 is a graphical illustration showing comparative smoke density for nylon-6 and nylon-6 containing hydrotalcite (HTC), bromide intercalated hydrotalcite (HTC/Br) and a commercially available halogen containing flame retardant(FR Control)

A comparison of the oxygen index and vertical burn data for Examples 6 and 7 show that the bromide-intercalated hydrotalcite achieved a V-0 rating at a lower loading level than hydrotalcite (50 wt % vs. 63 wt %) in nylon-6. The oxygen index at the 50 and wt % loading levels for the bromide-intercalated hydrotalcite are comparable to the 55 and 63 wt.%, respectively, loading levels for hydrotalcite. In addition, FIG. 7 illustrates a comparison of the smoke densities of the materials of Examples 6-7 at 63 wt % with ZYTEL FR10, a flame retardant for nylon 6,6 which is commercially available from Du Pont de Nemours, E. I. & Company. ZYTEL FR10 has a vertical burn rating of V-0 and oxygen index of 31.0. FIG. 7 shows that both hydrotalcite and bromide-intercalated hydrotalcite performed significantly better than the commercially available material. Thus, the bromideintercalation of hydrotalcite resulted in a better flame retardant and smoke suppressant material for nylon-6.

EXAMPLE 8

The procedures of Example 3 were repeated except that the bromide intercalated hydrotalcite was used as a filler in acrylonitrile-butadiene-styrene (ABS). The oxygen index and vertical burn values for the ABS containing bromide-intercalated hydrotalcite at the various loading levels are as follows:

| % Loading | Oxygen Index | Vertical Burn |
| --- | --- | --- |
| 0% | 18.5 | Failed |
| 30% | 21.5 | Failed |
| 40% | 23.5 | Failed |
| 50% | 26.5 | V-0 |
| 55% | 29.0 | V-0 |
| 63% | 34.0 | V-0 |

EXAMPLE 9

The procedures of Example 3 were repeated except that the synthetic hydrotalcite material of Example 1 was used as a filler in acrylonitrile-butadiene-styrene (ABS). The oxygen index and vertical burn values for ABS containing hydrotalcite at the various loading levels are as follows:

| % Loading | Oxygen Index | Vertical Burn |
| --- | --- | --- |
| 0% | 18.5 | Failed |
| 30% | 21.0 | Failed |
| 40% | 22.5 | Failed |
| 50% | 25.0 | Failed |
| 55% | 26.5 | V-0 |
| 63% | 30.5 | V-0 |

EXAMPLE 10

The procedures of Example 3 were repeated except that aluminum trihydrate (ATH) was used as a filler in acrylonitrile-butadiene-styrene (ABS). The oxygen index and vertical burn values for ABS containing hydrotalcite at the various loading levels are as follows:

| % Loading | Oxygen Index | Vertical Burn |
| --- | --- | --- |
| 0% | 18.5 | Failed |
| 30% | 21.0 | Failed |
| 40% | 22.5 | Failed |
| 50% | 26.0 | V-1 |
| 55% | 29.0 | V-0 |
| 63% | 35.5 | V-0 |

A comparison of the oxygen index and vertical burn data for Examples 8-10 indicate that both ATH and the bromide-inter calated hydrotalcite performed about the same. However, the bromide-intercalated hydrotalcite achieved a V-O rating at a lower loading level. In addition, bromide-intercalated hydrotalcite achieved a V-0 rating at a lower loading level than hydrotalcite (55 wt % vs. 50 wt %) in ABS. The oxygen index at the 55 wt % loading level for the bromide-intercalated hydrotalcite is comparable to the 63 wt % loading level for hydrotalcite.

Figure 8:
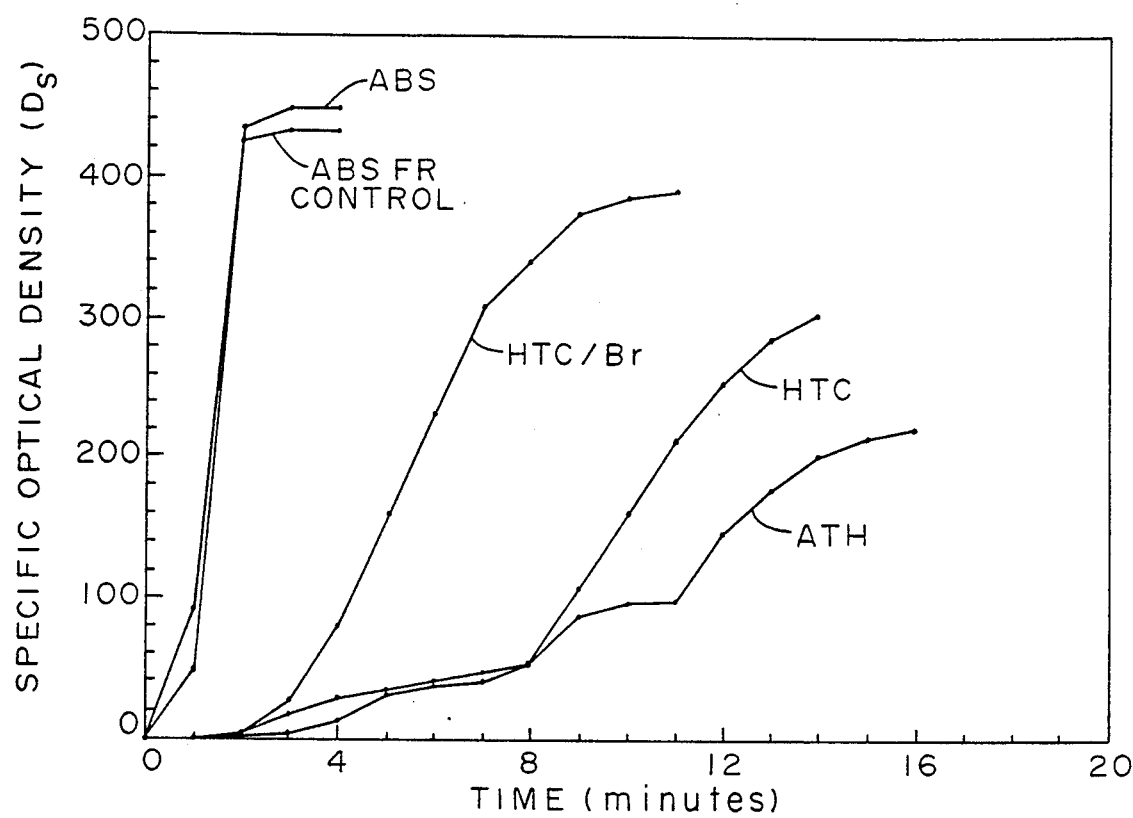
FIG. 8 is a graphical illustration showing comparative smoke density for acrylonitrile-butadiene-styrene (ABS) and ABS containing hydrotalcite (HTC), bromide intercalated hydrotalcite (HTC/Br), aluminum trihydrate (ATH) and a commercially available halogen containing flame retardant(FR Control)

FIG. 8 illustrates a comparison of the smoke densities of the materials of Examples 8-10 at 63 wt % with CYCOLAC KJB, a flame retardant ABS which is commercially available from Borg-Warner. CYCOLAC KJB has a vertical burn rating of V-0 and oxygen index of 32.0. FIG. 8 shows that both hydrotalcite and bromide-intercalated hydrotalcite performed significantly better than the commercially available material. Thus, the bromide-intercalation of hydrotalcite resulted in a material having a better combination of flame retardancy and smoke suppressancy than either ATH or hydrotalcite in ABS.

EXAMPLE 11

The procedures of Example 3 were repeated except that the bromide intercalated hydrotalcite was used as a filler in polybutylene terephtalate (PBT). The oxygen index and vertical burn values for the PBT containing bromide-intercalated hydrotalcite at various loading levels are as follows:

| % Loading | Oxygen Index | Vertical Burn |
| --- | --- | --- |
| 0% | 20.0 | Failed |
| 30% | 23.5 | Failed |
| 40% | 27.5 | Failed |
| 50% | 32.5 | V-0 |
| 55% | 35.0 | V-0 |
| 63% | 51.0 | V-0 |

EXAMPLE 12

The procedures of Example 3 were repeated except that the synthetic hydrotalcite material of Example 1 was used as a filler in polybutylene terephtalate (PBT). The oxygen index and vertical burn values for PBT containing hydrotalcite at the various loading levels are as follows:

| % Loading | Oxygen Index | Vertical Burn |
| --- | --- | --- |
| 0% | 20.0 | Failed |
| 30% | 22.0 | Failed |
| 40% | 24.0 | Failed |
| 50% | 27.5 | V-1 |
| 55% | 30.5 | V-0 |
| 63% | 34.0 | V-0 |

A comparison of the oxygen index and vertical burn data for Examples 11 and 12 show that the bromide-intercalated hydrotalcite achieved a V-0 rating at a lower loading level than hydrotalcite (50 wt.% vs. 55 wt.%) in PBT. In addition, the oxygen index at the 55 wt.% loading level for the bromide-intercalated hydrotalcite is comparable to the 63wt % loading level for hydrotalcite. The oxygen index for the PBT containing bromide-intercalated hydrotalcite is significantly higher than that for PBT containing hydrotalcite.

Figure 9:
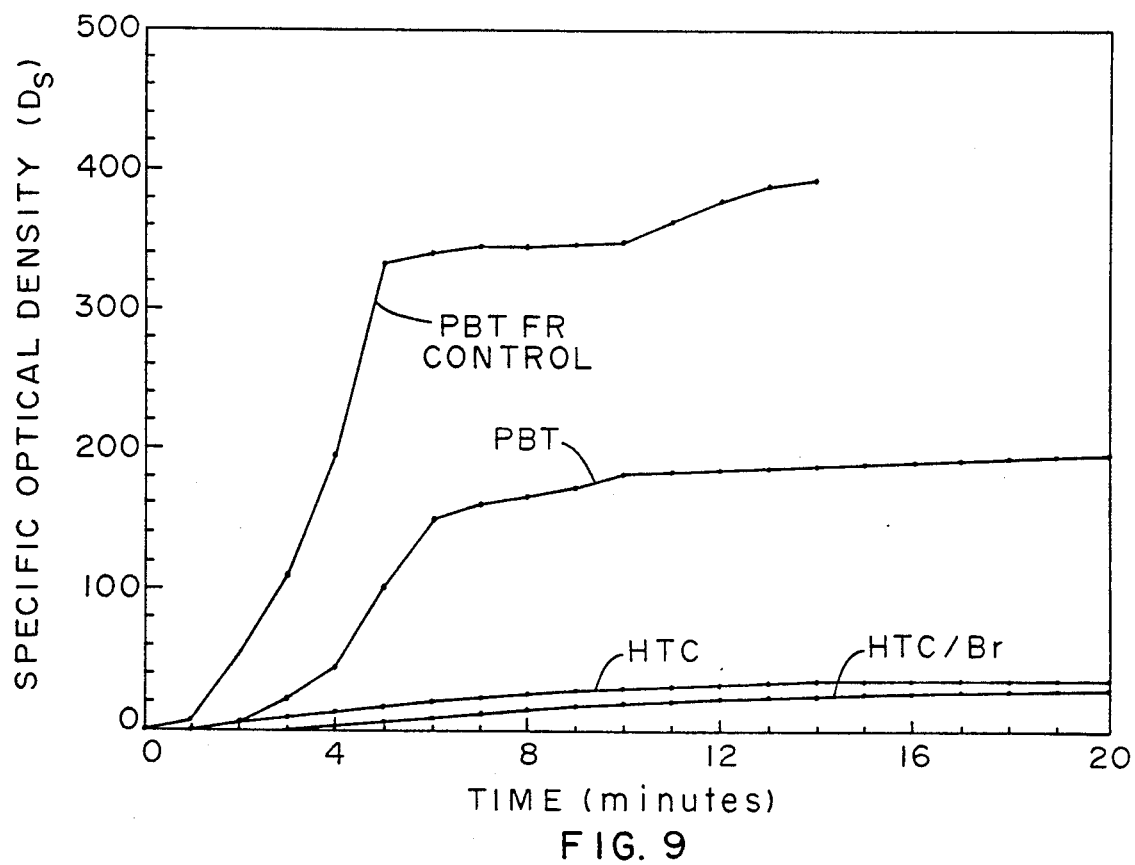
FIG. 9 is a graphical illustration showing comparative smoke density for polybutylene terephtalate (PBT) and PBT containing hydrotalcite (HTC), bromide intercalated hydrotalcite (HTC/Br) and a commercially available halogen containing flame retardant(FR Control)

FIG. 9 illustrates a comparison of the smoke densities of the materials of Examples 11 and 12 at 63 wt.% with KU1-7503NT, a flame retardant PBT which is commercially available from Mobay. KU1-7503NT has a vertical burn rating of V-0 and oxygen index of 31.0. FIG. 9 shows that both hydrotalcite and bromide-intercalated hydrotalcite performed significantly better than the commercially available material. Thus, the bromide-intercalation of hydrotalcite resulted in a better flame retardant and smoke suppressant material for PBT.

EXAMPLE 13

One pound of synthetic hydrotalcite formed from the same source as that used in Example 1 was heated to 500° C. to drive off most of its hydroxyl and carbonate groups. The resulting alumina substituted magnesia was placed in a 3 liter polyethylene bottle containing 3 liters of 300 grams per liter sodium chloride. The container was sealed and agitated on a roller mill for 24 hours at room temperature. Chemical analysis of the reconstituted hydrotalcite revealed that 5.35 wt.% Cl had been incorporated into the hydrotalcite lattice. This material was incorporated into polypropylene at a 63 wt.% loading level and was found to have a V-0 rating in the vertical burn test.

It is contemplated that the times and temperatures used in calcining to remove the water of hydration and/or carbonate may be varied without departing from the invention. The exact temperature used will depend on the material and the temperatures at which it evolves gas, as well as the processing temperatures of the polymer system in which it is to be used.

It is also contemplated that methods other than heating or calcining may be used to remove the water of hydration which is detrimental to polymer processing. Thus, for example, the water of hydration may be removed by direct chemical reaction.

Since changes may be made in the processes described in the above examples without departing from the scope of the invention herein involved, it is intended that all matter contained in the above description or shown in the accompanying drawings shall be interpreted as illustrative. The present invention is indicated by the broad general meaning of the terms in which the appended claims are expressed.

What is claimed is:

1. A method of improving the flame retardancy of polymers, said method comprising the steps of:
   providing hydrotalcite which has been calcined to remove carbonate and water of hydration in said hydrotalcite;
   intercalating halide(s) selected from the group consisting of chloride and bromide into said calcined hydrotalcite, and
   adding said halide-intercalated hydpotalcite as a filler in a polymer system.

2. The method of claim 1 in which said step of providing hydrotalcite includes:
   providing hydrotalcite which has been heat treated to a temperature between about 400° C. and 600° C.

3. The method of claim 1 in which said step of providing hydrotalcite includes:
   providing hydrotalcite which has been heat treated to a temperature less than approximately 600° C.

4. The method of claim 1 in which said step of adding said halide-intercalated hydrotalcite to a polymer includes:
   adding said halide-intercalated hydrotalcite as a filler in a polymer system selected from the group consisting of polypropylene, polybutylene terephtalate, nylon, and acrylonitrile-butadiene-styrene and blends thereof.

5. The method of claim 1 in which said step of adding said halide intercalated hydrotalcite to a polymer includes:
   adding said halide-intercalated hydrotalcite as a 22-65 wt % filler.

6. The method of claim 1 in which said step of adding said halide-intercalated hydrotalcite as a filler in a polymer system includes polymers selected from the group consisting of latex, polypropylene, polyester, polyamide, polyurethane, polystyrene, PET, ethylene, ethylene-vinyl acetate, ethylene ethyl acrylate, nylon.

7. The method of claim 1 in which said step of intercalating halide(s) into said hydrotalcite includes:
   intercalating a bromide into said hydrotalcite.

8. The method of claim 7 in which said step of intercalating a bromide into said hydrotalcite includes:
   adding said hydrotalcite to a NaBr solution for a time sufficient to permit bromide to intercalate.

9. The method of claim 8 in which said step of adding said hydrotalcite includes:
   placing said NaBr solution in a nitrogen atmosphere.

10. The method of claim 8 in which said step of adding said hydrotalcite further includes:

keeping said hydrotalcite in said NaBr solution for about 1 to 24 hours.

11. A method of improving the flame retardancy of a polymer, said method comprising the steps of:
   (a) providing a hydrotalcite which has been synthesized from activated magnesia;
   (b) calcining said synthetic hydrotalcite to remove carbonate and water of hydration;
   (c) intercalating bromide into said hydrotalcite; and
   (d) adding said bromide-intercalated hydrotalcite as a 25-65 wt % filler to said polymer system.

12. The method of claim 11 in which said step of calcining said hydrotalcite includes:
   activating said hydrotalcite by heating to a temperature from about 400° C. to about 600° C.

13. The method of claim 11 in which said step of adding said bromide intercalated hydrotalcite as a filler in a polymer system includes:
   adding said bromide intercalated hydrotalcite as a filler in a polymer system selected from the group consisting of polypropylene, polybutylene terephtalate, nylon, and acrylonitrile-butadiene-styrene.

14. The method of claim 11 wherein the activated magnesia of step (a) is made by:
   heating magnesium carbonate, magnesium hydroxy carbonate or magnesium hydroxide to about 400-900° C.

15. The method of claim 11 in which said step of intercalating a bromide into said hydrotalcite includes:
   adding said hydrotalcite to a NaBr solution for a time sufficient to permit bromide to intercalate.

16. The method of claim 15 in which said step of adding said hydrotalcite includes:
   submsersing said hydrotalcite in a NaBr solution for 24 hours.

17. The method of claim 15 in which said step of adding said hydrotalcite includes:
   placing said NaBr solution in a nitrogen atmosphere.

18. A method of improving the smoke suppressancy of polymers, said method comprising the steps of:
   providing hydrotalcite which has been heat treated to remove at least 50% of carbonate and water of hydration in said hydrotalcite;
   intercalating halide(s) selected from the group consisting of chloride and bromide into said treated; and
   adding, said halide-intercalated hydrotalcite as a filler in a polymer system.

19. The method of claim 18 in which said step of providing hydrotalcite includes:
   providing hydrotalcite which has been heat treated to a temperature between about 400° C. and 600° C.

20. The method of claim 18 in which said step of providing hydrotalcite includes:
   providing hydrotalcite which has been heat treated to a temperature less than approximately 600° C.

21. The method of claim 18 in which said step of adding said halide-intercalated hydrotalcite to a polymer includes:
   adding said halide-intercalated hydrotalcite as a filler in a polymer system selected from the group consisting of polypropylene, polybutylene terephthalate, nylon, and acrylonitrile-butadiene-styrene and blends thereof.

22. The method of claim 18 in which said step of adding said halide intercalated hydrotalcite to a polymer includes:
   adding said halide-intercalated hydrotalcite as a 22-65 wt % filler.

23. The method of claim 18 in which said step of intercalating halide (s) into said hydrotalcite includes:
   intercalating a bromide into said hydrotalcite.

24. The method of claim 23 in which said step of intercalating a bromide into said hydrotalcite includes:
   adding said hydrotalcite to a NaBr solution for a time sufficient to permit bromide to intercalate.

25. The method of claim 24 in which said step of adding said hydrotalcite further includes:
   keeping said hydrotalcite in said NaBr solution for about 1 to 24 hours.

26. The method of claim 24 in which said step of adding said hydrotalcite includes:
   placing said NaBr solution in a nitrogen atmosphere.

* * * * *